M. J. KELLY.
AIR COOLING AND DISTRIBUTING APPARATUS.
No. 7,643. Reissued April 24, 1877.
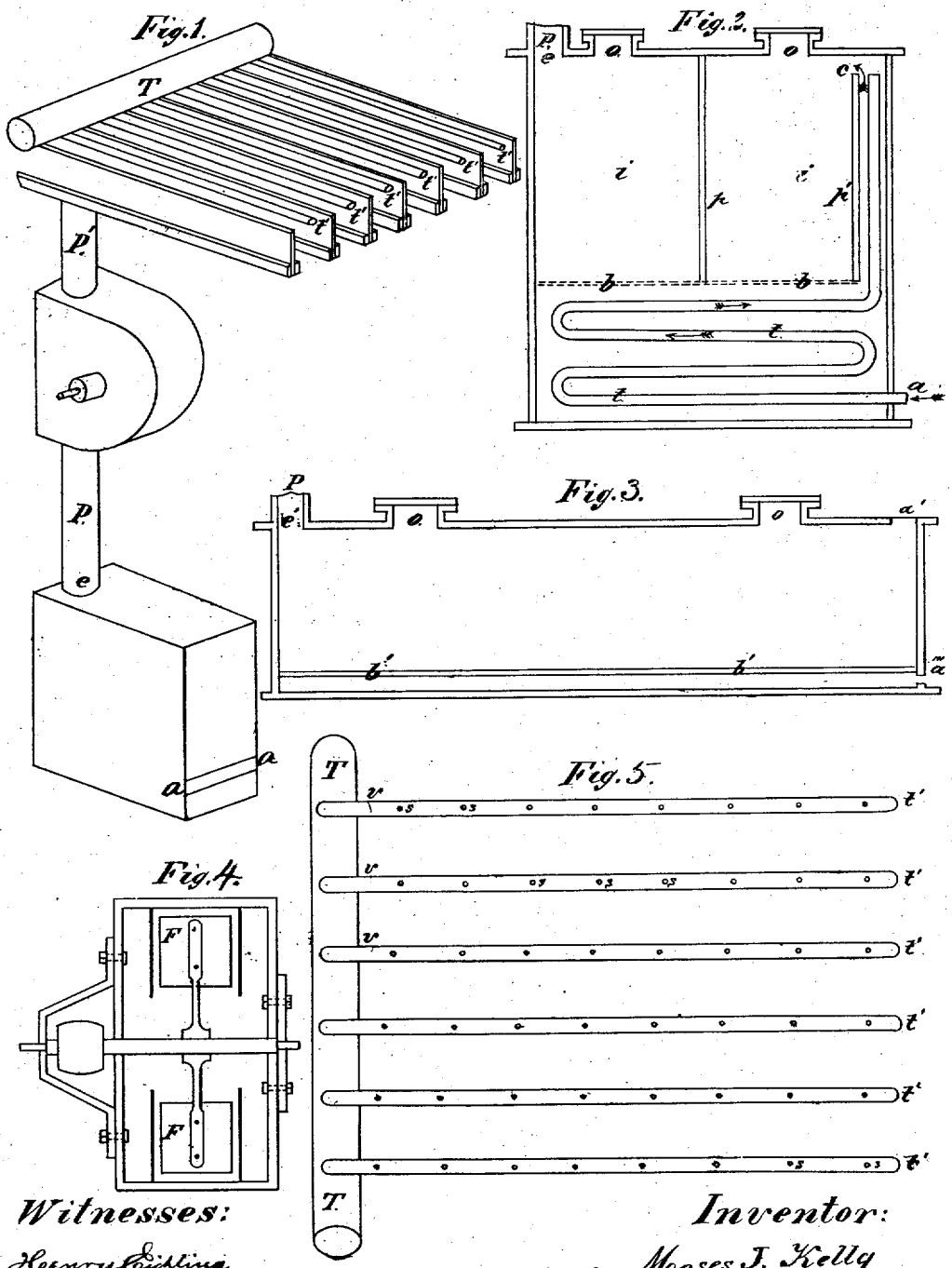
Witnesses:
Henry Eisling
H. Wells Jr.
Inventor:
Moses J. Kelly
per James A. Whitney
Atty

UNITED STATES PATENT OFFICE.

MOSES J. KELLY, OF CHICAGO, ILLINOIS.

IMPROVEMENT IN AIR COOLING AND DISTRIBUTING APPARATUS.

Specification forming part of Letters Patent No. 44,731, dated October 18, 1864; antedated October 6, 1864; Reissue No. 7,643, dated April 24, 1877; application filed January 4, 1877.

*To all whom it may concern:*

Be it known that I, MOSES J. KELLY, of Chicago, in the county of Cook and State of Illinois, have invented a new and useful Improvement in Air Cooling and Distributing Apparatus, for cooling carcasses where hung to cool in slaughtering-establishments, cooling halls, railroad-cars, grain-bins, the holds of vessels, and other places and apartments in which it may be desired to reduce the temperature of the atmosphere by the introduction of cool or cold air, which I denominate an "atmosphere-cooler;" and I hereby declare that the following is a full, clear, and exact description of the construction and operation of the same, reference being had to the annexed drawings, making a part of this specification, in which—

Figure 1 is a perspective view; Figs. 2 and 3, respectively, vertical longitudinal sections of two forms of chests or receptacles for ice; Fig. 4, a section of the fanners used for giving motion to the air, with the casing in which the same is inclosed; and Fig. 5, an under-side view of the tubes or conductors through and by which cold or cool air is conveyed and distributed to the carcasses hanging in slaughtering-establishments.

The form of ice-chest represented in Fig. 2 is constructed substantially as follows: The length is about the same as the height, and the width one-half the length, made air and water tight, with bottom *b* of loose boards, one-third the distance from bottom to top. A tight partition, *p*, extends from the top to the loose bottom, and another, *p'*, from the loose bottom *b* to *c*. A flattened metallic tube, *t t*, &c., as wide as the box will admit, or a system of small tubes, extends from *a* in the direction of the arrows to *c*. At *o o* are openings or hatches for filling the parts *l l* with ice, and the cold water resulting from the thawing of the ice descends below the loose bottom *b*, and surrounds the tubes *t t*, so that the air which enters them at *a* is somewhat cooled before it passes into the ice-apartment *i* at *c*, and still further cooled in passing down through the ice in that apartment, and under the partition *p*, and up through the ice in the apartment *i* into the pipe P at *e*.

Fig. 3 represents another form of ice chest or chamber, used when it is not necessary to economize by the use of the cold water resulting from the thawing of the ice, of length, width, and depth such as to contain an amount of ice necessary for the work to be done. The air entering at *a'* or at *a''''* is cooled in passing over or through the ice (of which the box should be kept full, or nearly so) before it enters the pipe P at *e*; or an ice-house, where one is at hand, may be so arranged as to supply cool air, in which case a tight covering is made over all or a portion of the ice in such ice-house, as low as the ice will admit, so that the air, being admitted on one side, is sufficiently cooled by being brought in contact with the ice before it passes out at the other side into the pipe P, as at *e*.

Fig. 4 represents common fanners F, inclosed within an air-tight casing, or otherwise, directly connected with the pipe B, so that (the fanners being put in motion by a belt on the pulley, or otherwise) all the air they move is drawn through the pipe P.

In Fig. 5, T represents the large pipe, tube, or conductor, overhead in slaughtering-establishments, leading from the fanners; and *t' t' t'*, &c., smaller ones leading from it immediately over each row of carcasses, and in which S S S are slots or openings from which currents of air issue and descend, or are driven upon each carcass, or part of one, as may be desired. At *v* are valves, which serve to shut off the air from the small tubes at pleasure.

Now, the ice being arranged in either of the aforesaid ways, and the fanners put in rapid motion, a portion of air is rapidly cooled and forced through the pipe P' into any place or apartment to be cooled, and there distributed through and from a sufficient number of small perforated tubes, to properly equalize the air thus introduced or distributed to the carcasses hanging in the slaughtering-house through the system of tubes represented in Figs. 1 and 5, as aforesaid.

What I claim as my invention, and desire to secure by Letters Patent, is—

1. In an air-cooler or apparatus for cooling carcasses, &c., the combination of a fan-blower, or its equivalent, an ice-chest, or equivalent, and one or more pipes or conduits, which equally distribute the air within the place or apartment to be cooled, substantially as and for the purpose herein set forth.

2. In an air-cooler or apparatus for cooling carcasses, &c., the combination, with the ice-chest, of one or more perforated distributing or equalizing tubes or conduits, substantially as and for the purpose herein set forth.

3. In an air-cooler or apparatus for cooling carcasses by a forced current of air, &c., the ice-chest having an oblong opening at or near its bottom, and extending nearly or quite across the width of the ice-chest, substantially as represented in Fig. 1, for the purpose specified.

4. In an air-cooler or apparatus for cooling carcasses, &c., an ice-chest having an internal partition which is arranged with reference to its inlet *c* and outlet *e*, substantially as shown in Fig. 2, for the purpose specified.

5. In an air-cooler or apparatus for cooling carcasses, &c., the combination of the fan-blower or fanners F, the system of tubes T *t′* *t′*, &c., and the ice chest or depository in either of said forms, as and for the purpose shown and represented.

MOSES J. KELLY.

Witnesses:
HENRY B. BERGEN,
HENRY B. MASON,